June 4, 1963  J. R. SCLAFANI  3,091,782
APPARATUS FOR FLOTATION OF ARTICLES ON WATER
Filed June 11, 1962  3 Sheets-Sheet 2

INVENTOR.
JOSEPH R. SCLAFANI
BY Benj. T. Rauber
ATTORNEY

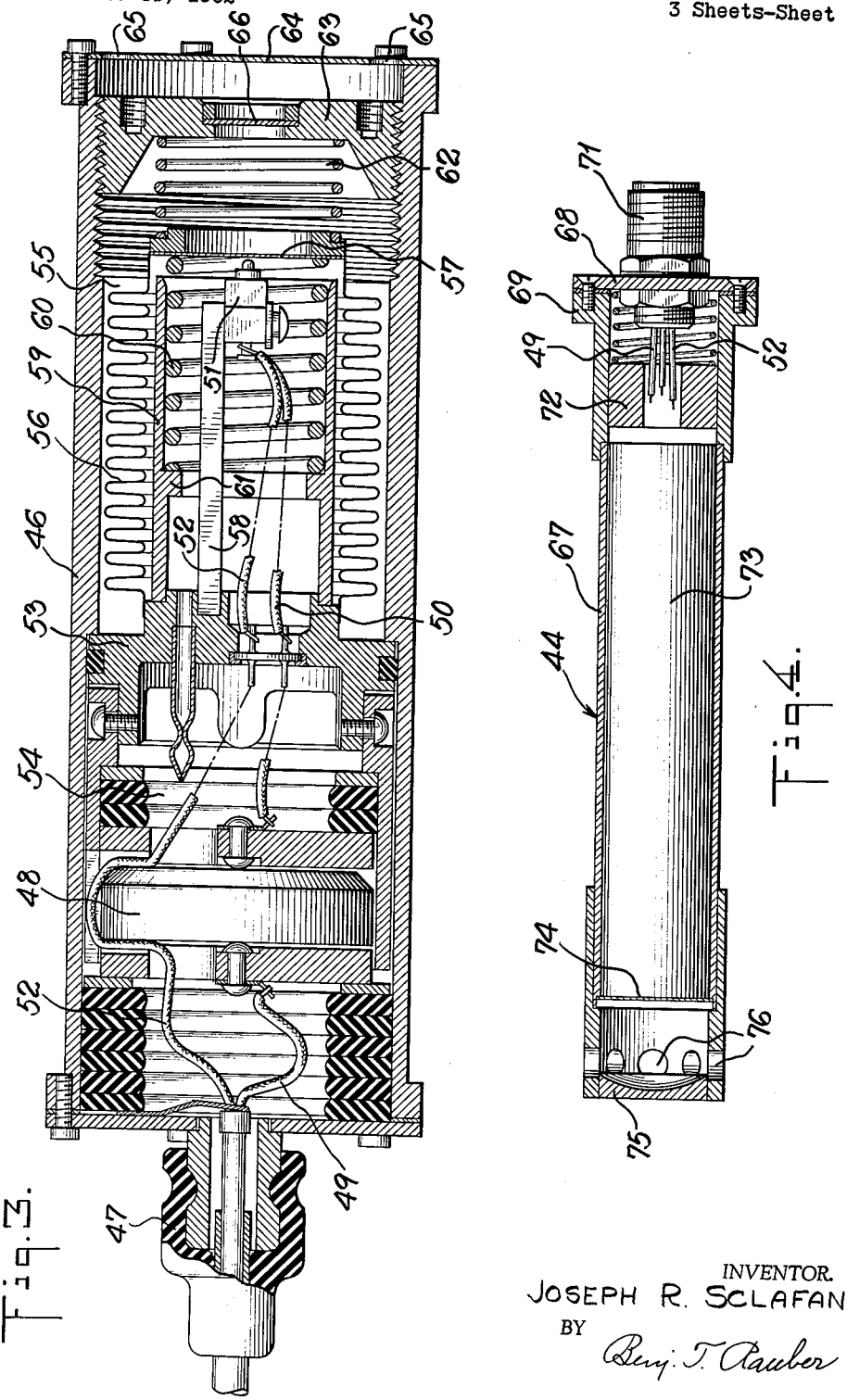

United States Patent Office 3,091,782
Patented June 4, 1963

3,091,782
APPARATUS FOR FLOTATION OF ARTICLES ON WATER
Joseph R. Sclafani, Old Greenwich, Conn., assignor to Aerotec Industries, Inc., Greenwich, Conn., a corporation of Connecticut
Filed June 11, 1962, Ser. No. 201,528
9 Claims. (Cl. 9—316)

My invention relates to apparatus for the flotation of articles landing on or dropping onto bodies of water. The invention is illustrated by an embodiment of the apparatus for the floating of a helicopter when landing on water.

The landing gear of a helicopter generally comprises a pair of skids or struts extending upwardly from the skids to the body of the helicopter. The skids and struts are of metal tubing having little or no buoyancy and therefore cannot serve to keep the helicopter from sinking into the water when landing thereon. To provide a landing gear of sufficient volume and buoyancy would add greatly to the bulk of the helicopter. This would impose an additional burden on the lifting capacity of the helicopter and would also increase the wind resistance in flight as well as imposing problems of maneuverability.

My invention as applied to a helicopter provides a flotation apparatus of minimum weight and bulk in its normal, collapsed, condition during flight and in landing on land but which automatically and immediately expands flotation elements secured on the landing gear to a displacement volume sufficient to float the helicopter.

In my invention I provide an inflatable bag for each strut of the helicopter, there being generally a minimum of four bags. In the normal operation of the helicopter and in landing and take-off from land, these bags are folded compactly, preferably about their respective struts and do not add significantly to the weight or bulk of the helicopter.

A liquid gas is contained under pressure in a container connected to the several bags by lines of piping and sealed in the container under normal conditions by a frangible partition in the outlet from the container. A squib is also provided in the container and has an electrically actuated detonator. A battery and a normally open pressure actuated switch is in circuit with the squib detonator. The switch is open under normal atmospheric pressure but is operated by hydraulic pressure when submerged in a few feet of water as, for example, four to six feet, to close the switch and set off the squib, which thereupon liberates heat to raise the temperature and accordingly the pressure in the container of liquefied gases sufficiently to break the frangible partition and open the container to the line of piping and thence to the bags inflating them sufficiently to buoy the helicopter above the level of the water. The piping connection to each individual bag is provided with a check valve to prevent return of the gas from the individual bags.

The bags are preferably made of a gastight reinforced elastomer composition such as of fabric reinforced vulcanized rubber. When used in connection with the landing gear of a helicopter they are of spherical or spheroidal shape when inflated and are mounted on respective struts with the struts extending axially therethrough and sealed at each fold of the bags. When the bags are deflated they are folded in folds about the strut and then wrapped to a cylindrical package about the strut. To protect them from abrasion or injury a cover is provided which wraps around the package of the folded bag and secured by fasteners which hold the bags folded securely until gas under pressure is admitted to the bags, whereupon the cover is released permitting the bags to expand to their spherical or spheroidal shape.

The pressure operated switch and battery are mounted in a casing secured to the wall of the gas container and communicate with a squib also mounted in the wall of the container and projecting inwardly in the gas container. The squib is in a casing and there may be two squibs in the casing to make doubly sure of the firing.

When the helicopter, or other article, drops to the water and sinks to a depth sufficient to actuate the pressure operated switch, a circuit is immediately made to the squib which then explodes or flashes generating heat sufficient to raise the pressure of the liquefied gas to a value sufficient to break the frangible partition leading to the piping system for the bags and the gas then flows into the bags inflating them and buoying the helicopter. The gas will be in amount sufficient to inflate the bags sufficiently under the pressure due to their submergence and thus serve to buoy the helicopter so that its body will be above the level of the water.

Any non-corrosive gas which can be liquefied at a practicable pressure may be employed. Liquefied ammonia ($NH_3$) is suited as a gas because owing to its low molecular weight it provides a maximum value of gas for a given weight.

The invention is illustrated by way of example in the accompanying drawings in which FIG. 1 is a diagrammatic perspective sketch of an embodiment of the invention as applied to the skids of a helicopter, one of the bags being shown in its inflated condition and the other three bags being shown folded to a package. This is merely for purposes of illustration, it being understood that in use when one bag is inflated all of them will be inflated;

FIG. 3 is a longitudinal sectional view of the battery and pressure actuated switch in their casing;

FIG. 4 is a longitudinal section of the squib, and

Figure 1:
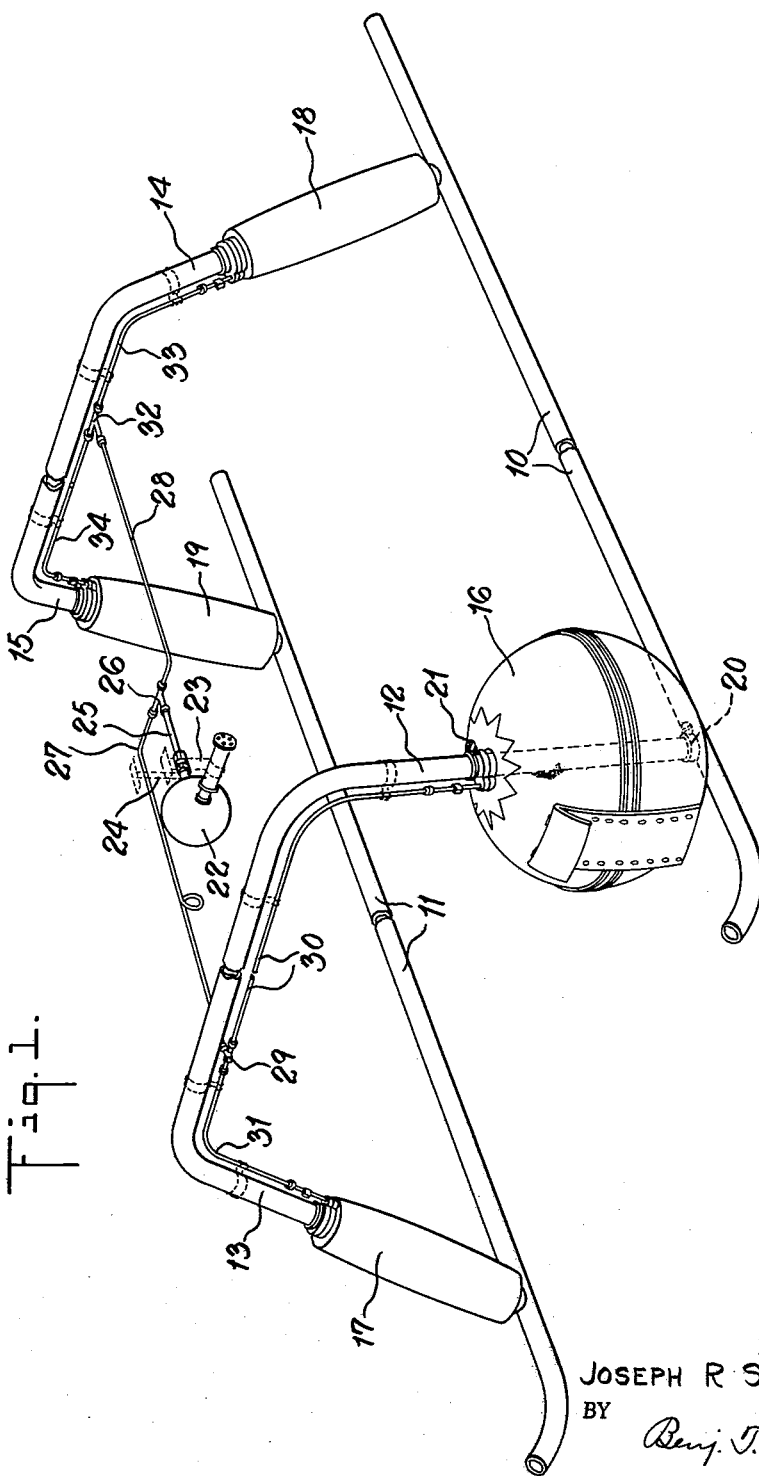

Referring more particularly to FIG. 1 of the drawings, the embodiment of the invention is illustrated as applying to the landing gear of a helicopter which landing gear comprises a pair of horizontal tubular skids 10 and 11 and struts 12, 13, 14 and 15 extending upwardly from the skids. These struts may be joined to each other and to the body of the helicopter in any suitable manner known in the art.

Mounted on the lower part of each strut is an inflatable gastight bag 16, 17, 18 and 19. The struts extend axially or diametrically through their respective bag and each bag is secured to the strut at its lower pole by means of a clamp shown at 20 on the bag 16, and its upper pole by a clamp 21. These clamps seal the bags to their respective struts airtightly. In the normal operation, that is, when landing on land or when in the air, these bags are folded as shown in connection with the bags 17, 18 and 19. But when submerged all of the bags will be inflated to the shape of bag 16.

The bags are inflated by means of gas supplied from a gas container 22 supported by means of brackets 23 to the body of the helicopter, not shown. The piping system adjacent the helicopter may also be supported from the body or part of the helicopter by means of a bracket, such as shown at 24.

When the squib is detonated and the pressure of the gas rises sufficiently to break the frangible seal the gas flows through a piping conduit 25 to a T-connection 26 to a pair of branches 27 and 28. The branch 27 leads to a T-connection 29 and thence to a sub-branch 30 extending to an inlet to the bag 16 and to a sub-branch 31 extending to an inlet to the bag 17. From the branch 28 the gas passes to a T 32 and thence through a sub-branch 33 to the bag 18 and a sub-branch 34 to the bag 19.

Figures 2, 5:
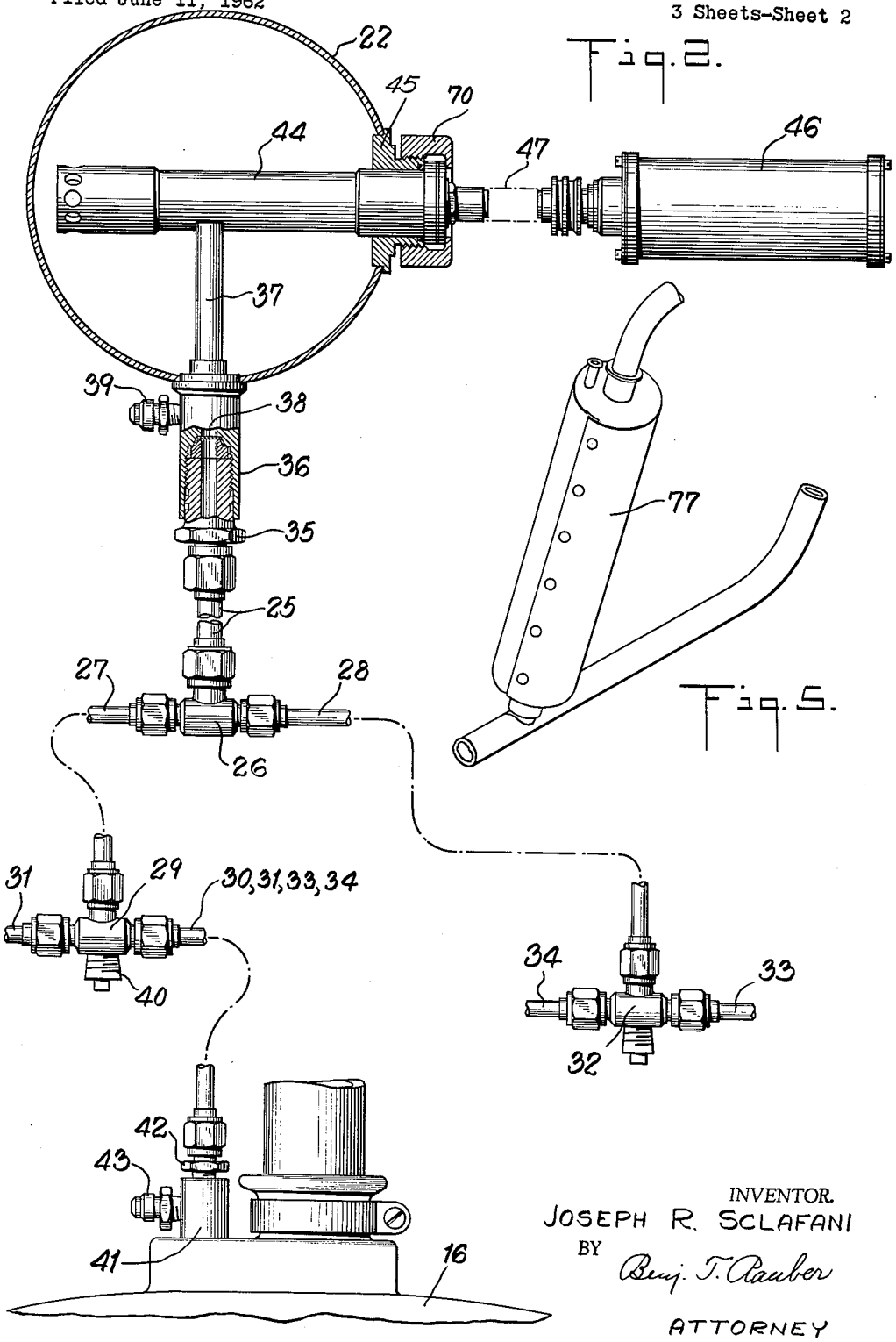
FIG. 2 is a sketch showing the liquefied gas container, the squib and switch circuit and the piping line from the gas container.
FIG. 5 is a detail view showing a bag wrapped about its supporting strut and enclosed in a protective sheath.

A portion of the piping system is shown in greater detail in FIG. 2 in connection with the gas container 22. As shown therein the piping conduit 25 is connected to the gas container by means of a connector 35 and a collar 36 into which the connector 35 is threaded and which has an extension 37 upwardly into the gas container 22. The extension 37 preferably rises above the level of the liquefied gas so that only the gas in gaseous phase will enter the extension 37 and from there the pipe 25.

A frangible disc 38 is mounted between the connector 35 and the collar 36 to form a gastight seal between the collar and the connector and pipe 25. This frangible disc thus seals the gas under normal pressure from the piping system, but upon the vaporization of the liquid gas to create a pressure sufficiently high, for example, 1500 pounds per square inch, the gaseous pressure will break the frangible disc and permit gas to flow into the piping system.

To fill the gas container an inlet nipple 39 containing a known return check valve is provided on the collar 36 above the frangible disc 38. The T's 29 and 32 are each provided with a clean-out plug 40 which may be removed when the system is empty to remove any sediment that may have collected in the system. Also as shown in FIG. 2 the branch pipes 30, 31, 33 and 34 are connected to the respective bags, such as bag 16, by an inlet connector 41 into which the respective branch piping 30–34 is threaded. A check valve 42 is provided in the respective branch pipes at the point of entry of the connector 41 to prevent return flow of gas from each individual bag. Accordingly, in the event that the piping system should leak, or that any bag should collapse or be broken, the other bags will remain inflated. A bleed port 43 is provided between the check valve 42 and the connector 41.

As shown in FIG. 2, a squib and casing 44 are mounted in a connector element 45 in the wall of the liquefied gas chamber 22 in position to extend diametrically into the liquid container. The electric generator such as a battery, and the pressure actuated switch are mounted in a casing 46 which is connected through a connector 47 with the squib contained in the casing 44.

The switch for detonating the squib is shown in detail in FIG. 3. The embodiment shown therein comprises within the casing 46 a battery 48 having a lead 49 leading through the connector 47 to the squib and a connector 50 leading to one pole of a pressure actuated switch 51. A return lead 52 leads from the other terminal of the switch 51 through the connector 47 to the squib. A partition 53 divides the casing fluidtightly into a compartment 54 containing the battery and a compartment 55 containing the pressure actuated switch. One end of a corrugated bellows 56 is secured fluidtightly to the partition 53 and the other end is closed by a movable closure plate 57. The switch element 51 is supported within the bellows by means of a supporting bracket 58 with the actuating tip of the switch element closely adjacent the movable end plate 57.

The bellows is evacuated so as to provide an absolute pressure-actuated switch. Inward movement of the bellows and the plate 57 is limited by means of a stop 59 and the bellows is biased outwardly to space the plate 57 from the actuating tip of the switch 51 by means of a helical spring 60 supported at one end by a flange 61 extending inwardly from the cylindrical stop 59 and bearing on its opposite end against the movable closure plate 57. The biasing beyond a certain point is opposed by a helical spring 62 of lesser strength confined between the movable plate 57 and the end 63 of the casing 46. The casing 46 is also provided with a cover plate 64 having an inlet opening 65, and the end 63 is provided with an opening in which there is mounted a filter 66. When the pressure switch is immersed to a depth at which the hydraulic pressure and the atmospheric pressure will collapse the bellows sufficiently the switch 51 will be closed and current supplied detonate or fire the squib.

Any squib which will generate heat instantaneously or very rapidly may be used. The squib 44 shown in FIG. 4 is an example. It comprises a cylindrical casing 67 closed at one end by an end plate 68 and having a flange 69 which fits against the connector element 45, shown in FIG. 2, so that the squib may be fitted air- and fluid-tightly onto the connector 45 by means of the nut 70 as shown therein. The usual sealing means being employed. A threaded nipple 71 is mounted in the plate 68 through which passes the leads 49 and 52 of the switch, shown in FIG. 3.

The leads pass through an annular spacer 72 into a compartment 73 filled with a solid of combustible or explosive of the nature of gun powder. A rigid diaphragm 74 such as a metal diaphragm closes the end of the space opposite the spacer 72 and confines the explosive or heat generating material in the space or compartment 73. This diaphragm prevents any of the liquid ammonia reaching the explosive. The cylindrical casing extends beyond the diaphragm 74 and has an end cover plate or baffle tube 75 spaced from the diaphragm 74. The casing between the diaphragm 74 and the end plate or baffle is pierced with a number of openings 76.

When the circuit in the switch is closed electric current in the leads 49 and 52 which extend into contact with the explosive material or a detonator serves to ignite the material. The explosive or combustible instantly burns and generates sufficient pressure to fracture the diaphragm 74 permitting the products of combustion to come in contact with and heat the liquefied ammonia which immediately flashes into vapor, breaks the frangible disc 38 and then flows into the inflatable bags inflating them as described above.

Under normal conditions the inflatable bags are wrapped about the struts of the helicopter, one for each strut as shown in FIG. 5, and are enclosed in an enclosing sheath 77. The pressure of the gas immediately enters the bags and expands them, the pressure serving to separate the fastening means which are so selected that they will hold the sheath or cover firmly on the folded bags during normal flight and landing of the plane or helicopter but which will yield under the greater initial force of the gas.

For example, the pressure of the ammonia gas before it has expanded into the bags in inflating them may be of the order of about 1500 pounds per square inch, but much smaller as it expands into the bags.

A fastener for the bags is a zipper without a lock which is easily moved by the pressure of the gas to open the sheath. The sheath may be attached and retained on it in the position shown in FIG. 1.

My invention thus provides a flotation means which occupies no significant amount of space during a normal operation of the helicopter and adds little weight. It provides a flotation means which is automatically operative when submerged in water to a depth of a few feet.

In the particular embodiment shown the total capacity of the bags when inflated may be 9100 cubic inches for each bag and with four bags as shown this would support a weight of over six tons. The approximate weight of the entire system would be about 18 tons.

What I claim is:

1. Apparatus for the flotation of articles on water which comprises, an inflatable bag having means for attachment to the article to be floated, a container for liquefied gas under pressure, a squib in said container, an electric circuit comprising a detonating element for said squib, a battery and a pressure operated switch operable at a pressure of a few feet of water to close said circuit, and a connecting conduit from said container to said bag and comprising a frangible partition at the entrance of said conduit adjacent said container to confine said liquefied gas in said container under the pressure of said liquefied gas in the normal range of atmospheric temperatures.

2. The apparatus of claim 1 in which said gas is ammonia.

3. The apparatus of claim 1 having a check valve in said conduit adjacent said bag to check return of gas from said bag.

4. The apparatus of claim 1 having a plurality of bags and a branch conduit to each bag from a common supply conduit.

5. The apparatus of claim 1 in which said bags are spheroidal and have a supporting element extending axially therethrough and secured at the polar positions to said bag.

6. The apparatus of claim 5 in which said bags are folded and wrapped about said supporting element and in which said apparatus comprises a releasable sheath about said folded bags.

7. The apparatus of claim 1 in which said bags are of reinforced elastomer.

8. The apparatus of claim 1 in which said squib is secured in the wall of said container and projects into the interior of said container.

9. The apparatus of claim 8 in which said pressure switch is mounted on said squib and projects outwardly from the wall of said container.

References Cited in the file of this patent

UNITED STATES PATENTS

| | | |
|---|---|---|
| 2,621,874 | Boyle | Dec. 16, 1952 |
| 2,794,579 | McKernan | June 4, 1957 |
| 2,816,419 | Mueller | Dec. 17, 1957 |
| 2,840,833 | Fruendt | July 1, 1958 |
| 2,902,557 | Brockman | Sept. 1, 1959 |
| 2,955,785 | Smith | Oct. 11, 1960 |